US009615281B2

(12) United States Patent
Chun et al.

(10) Patent No.: US 9,615,281 B2
(45) Date of Patent: Apr. 4, 2017

(54) METHOD OF TRANSMITTING AND RECEIVING SIGNAL TO AND FROM NETWORK AT UE IN WIRELESS COMMUNICATION SYSTEM AND APPARATUS FOR THE SAME

(71) Applicant: LG ELECTRONICS INC., Seoul (KR)

(72) Inventors: Sungduck Chun, Anyang-si (KR); Sunghoon Jung, Anyang-si (KR); Seungjune Yi, Anyang-si (KR); Youngdae Lee, Anyang-si (KR); Sungjun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 14/346,289

(22) PCT Filed: Oct. 25, 2012

(86) PCT No.: PCT/KR2012/008795
§ 371 (c)(1),
(2) Date: Mar. 20, 2014

(87) PCT Pub. No.: WO2013/065995
PCT Pub. Date: May 10, 2013

(65) Prior Publication Data
US 2014/0233516 A1     Aug. 21, 2014

Related U.S. Application Data

(60) Provisional application No. 61/555,488, filed on Nov. 4, 2011, provisional application No. 61/610,451, filed
(Continued)

(51) Int. Cl.
*H04W 24/10*     (2009.01)
*H04W 74/08*     (2009.01)
(Continued)

(52) U.S. Cl.
CPC ........... *H04W 24/10* (2013.01); *H04W 24/08* (2013.01); *H04W 74/0833* (2013.01); *H04W 76/027* (2013.01)

(58) Field of Classification Search
CPC . H04W 24/10; H04W 24/08; H04W 74/0883; H04W 76/027
See application file for complete search history.

(56) References Cited

U.S. PATENT DOCUMENTS

| 8,577,360 B2 * | 11/2013 | Olsson ........................ 455/423 |
| 2011/0051609 A1 * | 3/2011 | Ishii et al. .................... 370/252 |

(Continued)

FOREIGN PATENT DOCUMENTS

| WO | 2010/105518 | 9/2010 |
| WO | 2010/145427 | 12/2010 |
| WO | 2011/093665 | 8/2011 |

OTHER PUBLICATIONS

Ericsson, ST-Ericsson, "Accessibility measurements for MDT," 3GPP TSG-RAN WG2 Meeting #77bis, R2-121605, Mar. 2012, 3 pages.*

(Continued)

*Primary Examiner* — Kwang B Yao
*Assistant Examiner* — Moo Ryong Jeong
(74) *Attorney, Agent, or Firm* — Lee Hong Degerman Kang Waimey

(57) ABSTRACT

A method of transmitting and receiving a signal to and from a network at a user equipment (UE) in a wireless communication system. The method includes steps of logging information about failure of a first connection establishment procedure if the first connection establishment procedure with the network has failed, and transmitting the logged information to the network when a second connection establishment procedure with the network is successful.

3 Claims, 10 Drawing Sheets

Related U.S. Application Data on Mar. 13, 2012, provisional application No. 61/612,401, filed on Mar. 19, 2012, provisional application No. 61/672,781, filed on Jul. 18, 2012, provisional application No. 61/675,831, filed on Jul. 26, 2012.

(51) Int. Cl.
*H04W 76/02* (2009.01)
*H04W 24/08* (2009.01)

(56) References Cited

U.S. PATENT DOCUMENTS

| 2011/0299415 | A1 | 12/2011 | He et al. | |
|---|---|---|---|---|
| 2014/0066074 | A1* | 3/2014 | Folke et al. | 455/437 |

OTHER PUBLICATIONS

Ericsson, ST-Ericsson, "Accessibility measurements for MDT," 3GPP TSG-RAN WG2 Meeting #77, R2-120507, Feb. 2012, 3 pages.*
MediaTek, "Introduction of MDT enhancements," 3GPP TSG-RAN WG2 Meeting #76, R2-116547, Nov. 14-18, 2011.*
Ericsson, ST-Ericsson, "Accessibility measurements for MDT," 3GPP TSG-RAN WG2 Meeting #75bis, R2-115457, Oct. 2011, 2 pages.*
Catt, et al., "TP to 36.805: RRC connection re-establishment and Cell Update after Radio Link Failure", R2-095232, 3GPP TSG-RAN WG2 meeting #67, Aug. 2009, 7 pages.
LG Electronics Inc., "RLF reporting enhancements", R2-104005, 3GPP TSG-RAN WG2 #70bis, Jun. 2010, 2 pages.
Catt, "Enhancement and simplification for UE RLF reporting", R2-103763, 3GPP TSG RAN WG2 Meeting #70bis, Jun. 2010, 2 pages.
PCT International Application No. PCT/KR2012/008795, Written Opinion of the International Searching Authority dated Mar. 15, 2013, 8 pages.
3rd Generation Partnership Project (3GPP), "Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3GPP TS 37.320 V11.1.0, Sep. 2012, 21 pages.
Huawei, "UE RACH failure report," 3GPP TSG-RAN WG2 Meeting #70bis, R2-103780, Jun. 2010, 2 pages.
Ericsson, et al., "Accessibility measurements for MDT," 3GPP TSG-RAN WG2 #75bis, Tdoc R2-115457, Oct. 2011, 1 page.
European Patent Office Application Serial No. 12844993.1, Search Report dated Jun. 24, 2015, 11 pages.

* cited by examiner

Fig. 3
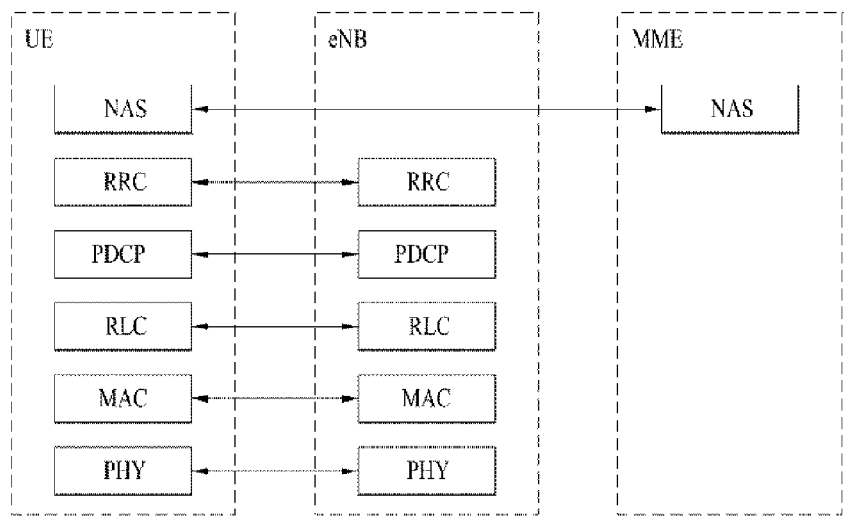
(a) Control-plane protocol stack
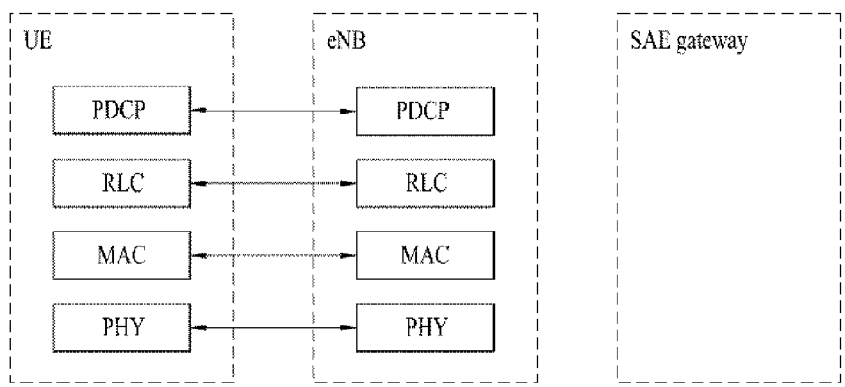
(b) User-plane protocol stack

[Fig. 4

METHOD OF TRANSMITTING AND RECEIVING SIGNAL TO AND FROM NETWORK AT UE IN WIRELESS COMMUNICATION SYSTEM AND APPARATUS FOR THE SAME

CROSS-REFERENCE TO RELATED APPLICATIONS

This application is the National Stage filing under 35 U.S.C. 371 of International Application No. PCT/KR2012/008795, filed on Oct. 25, 2012, which claims the benefit of U.S. Provisional Application Ser. Nos. 61/555,488, filed on Nov. 4, 2011, 61/610,451, filed on Mar. 13, 2012, 61/612,401, filed on Mar. 19, 2012, 61/672,781, filed on Jul. 18, 2012, and 61/675,831, filed on Jul. 26, 2012, the contents of which are all hereby incorporated by reference herein in their entirety.

TECHNICAL FIELD

The present invention relates to a wireless communication system, and more particularly, to a method of, at a user equipment (UE), transmitting and receiving a signal to and from a network in a wireless communication system and an apparatus for the same.

BACKGROUND ART

As an example of a wireless communication system to which the present invention is applicable, a 3rd Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARM)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE OF INVENTION

Technical Problem

An object of the present invention devised to solve the problem lies on a method of, at a user equipment (UE), transmitting and receiving a signal to and from a network in a wireless communication system and an apparatus for the same.

Solution to Problem

The object of the present invention can be achieved by providing an apparatus/device a method of, at a user equipment (UE), transmitting and receiving a signal to and from a network in a wireless communication system, the method including: logging information about failure of a first connection establishment procedure if the first connection establishment procedure with the network has failed; and transmitting the logged information to the network when a second connection establishment procedure with the network is successful.

The information may include information about the number of times of transmission of a random access preamble attempted upon the first connection establishment procedure.

The information may include information about maximum transmit power of the random access preamble. The information may include information indicating whether maximum transmit power of the UE has been used when transmitting a random access preamble. The information may include information indicating whether contention with another UE has occurred in a random access procedure attempted during the first connection establishment procedure with the network.

The transmitting may include transmitting, to the network, a message indicating that the UE logs the information about failure of the first connection establishment procedure, receiving a message requesting the logged information from the network, and transmitting the logged information to the network.

A cell for which the first connection establishment procedure is performed and a cell for which the second connection establishment procedure is performed may be different from each other.

Advantageous Effects of Invention

According to the embodiment of the present invention, it is possible to efficiently transmit and receive a signal to and from a network at a user equipment (UE) in a wireless communication system.

The effects of the present invention are not limited to the above-described effects and other effects which are not described herein will become apparent to those skilled in the art from the following description.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 3 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard;

MODE FOR THE INVENTION

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Figure 1:
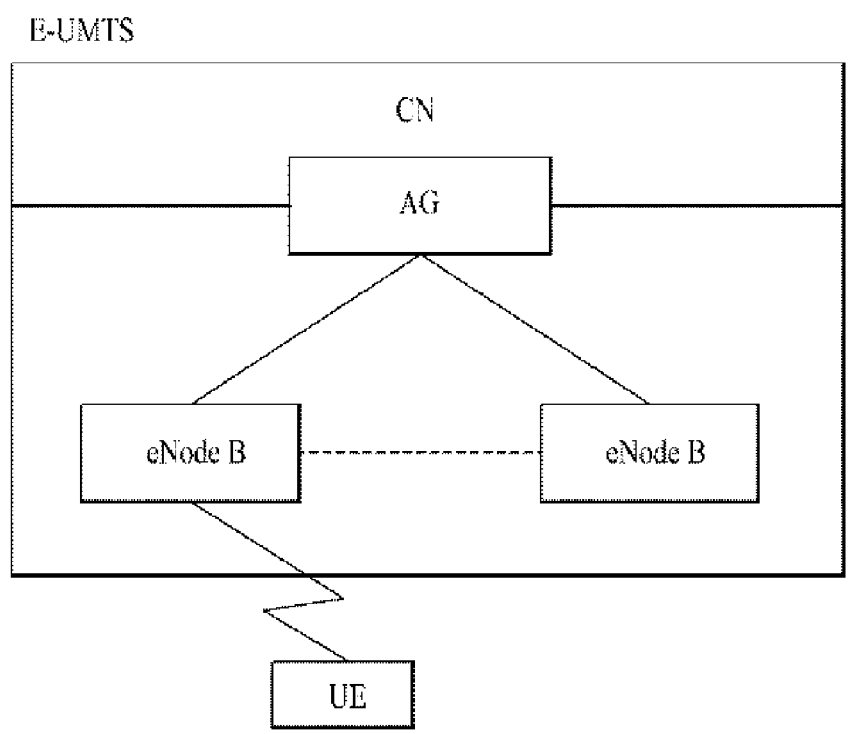
FIG. 1 is a diagram showing a network structure of an Evolved Universal Mobile Telecommunications System (E-UMTS) as an example of a wireless communication system.
Figure 2:
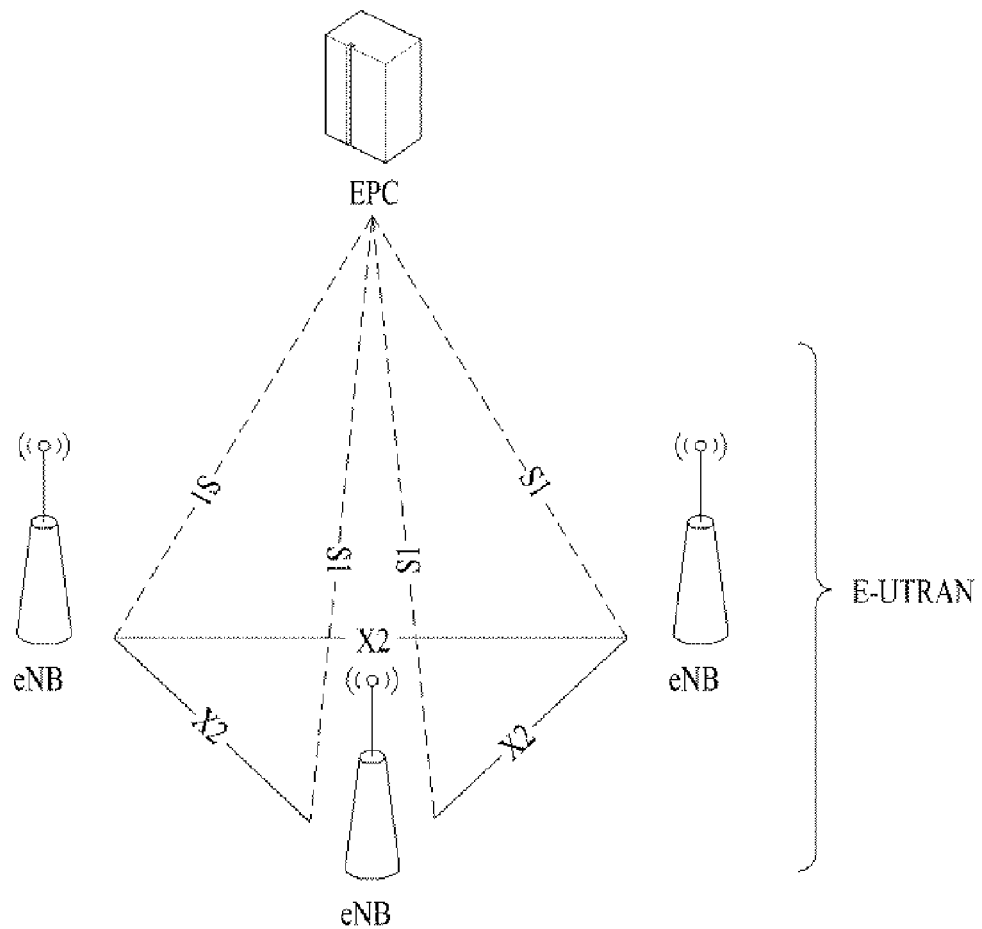
FIG. 2 is a diagram showing the concept of a network structure of an Evolved Universal Terrestrial Radio Access Network (E-UTRAN)

FIG. 2 is a diagram showing the concept of a network structure of an Evolved Universal Terrestrial Radio Access Network (E-UTRAN). In particular, the E-UTRAN system is a system evolved from the existing UTRAN system. The E-UTRAN includes eNBs and eNBs are connected via an X2 interface. A cell is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

FIG. 3 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
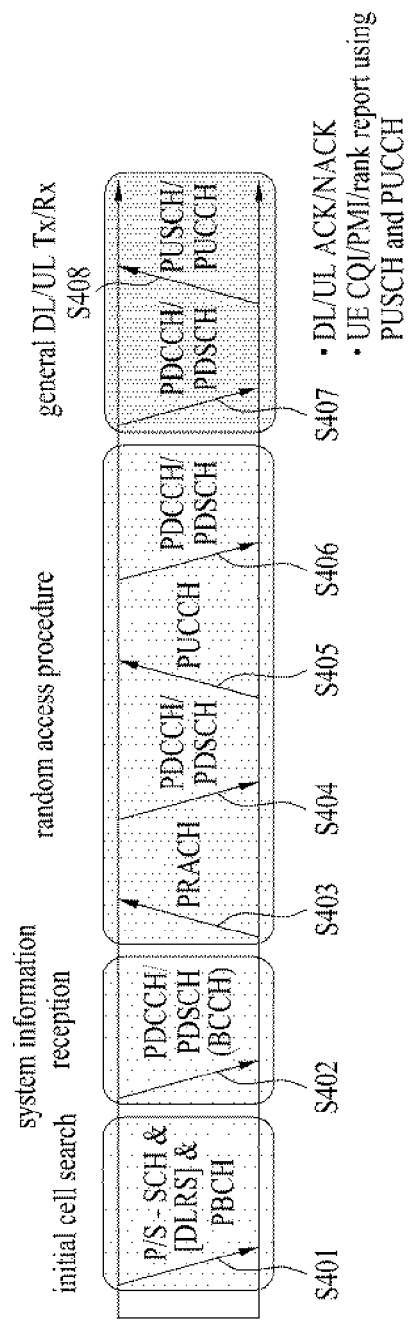
FIG. 4 is a diagram showing physical channels used in a 3GPP system and a general signal transmission method using the same.

FIG. 4 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 5:
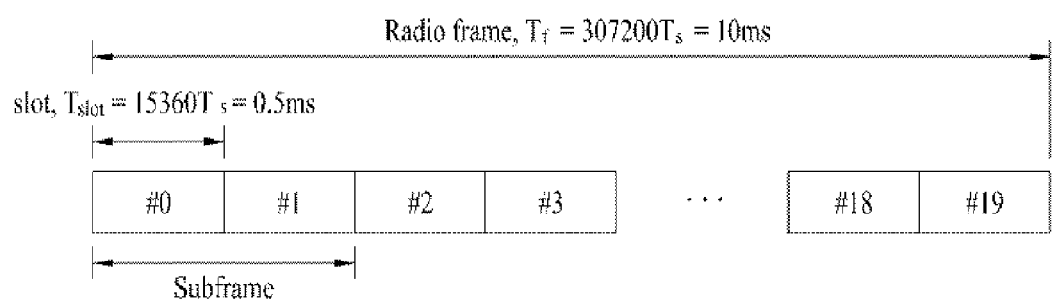
FIG. 5 is a diagram showing the structure of a radio frame used in a Long Term Evolution (LTE) system.

FIG. 5 is a diagram showing the structure of a radio frame used in a Long Term Evolution (LTE) system.

Referring to FIG. 5, the radio frame has a length of 10 ms (327200*Ts) and includes 10 subframes with the same size. Each of the subframes has a length of 1 ms and includes two slots. Each of the slots has a length of 0.5 ms (15360*Ts). Ts denotes a sampling time, and is represented by Ts=1/(15 kHz*2048)=3.2552*10$^{-8}$ (about 33 ns). Each slot includes a plurality of OFDM symbols in a time domain, and includes a plurality of resource blocks (RBs) in a frequency domain.

In the LTE system, one RB includes 12 subcarriers*7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Hereinafter, an RRC state of a UE and an RRC connection method will be described. The RRC state indicates whether the RRC layer of the UE is logically connected to the RRC layer of the E-UTRAN, is referred to as an RRC_CONNECTED state if connected, and is referred to as an RRC_IDLE state if not connected.

Since the E-UTRAN can check presence of the UE of the RRC_CONNETED state in cell units, it is possible to efficiently control the UE. In contrast, the E-UTRAN cannot check presence of a UE of the RRC_IDLE state and a core network (CN) manages the UE of the RRC_IDLE state in a tracking area (TA) unit which is greater than a cell. That is, the RRC_IDLE state of the UE should transition to the RRC_CONNECTED state in order to receive a service, such as voice or data.

In particular, when a user initially turns a UE on, the UE first searches for an appropriate cell and camps on the cell in an RRC_IDLE state. When RRC connection needs to be established, the UE which is in the RRC_IDLE state is RRC connected to the E-UTRAN via an RRC connection procedure so as to transition to the RRC_CONNECTED state. For example, if uplink data transmission is necessary due to call connection attempt of a user or if a response message is transmitted in response to a paging message received from the E-UTRAN, the UE which is in the idle state needs to be RRC connected to the E-UTRAN.

Figure 6:
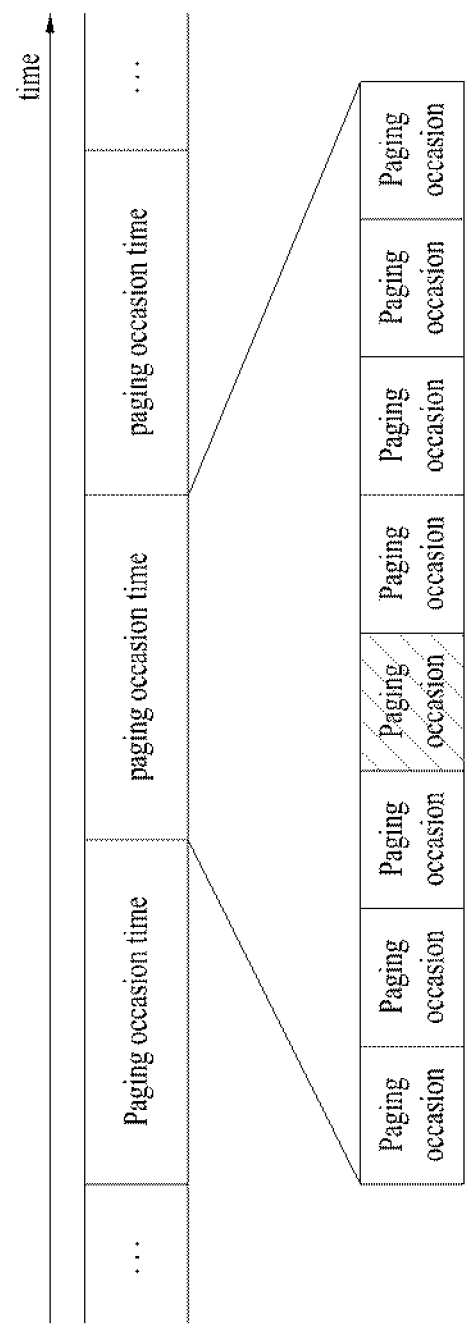
FIG. 6 is a diagram illustrating a general transmission and reception method using a paging message.

FIG. 6 is a diagram illustrating a general transmission and reception method using a paging message.

Referring to FIG. 6, the paging message includes a paging recording including a paging cause and a UE identity. When the paging message is received, the UE may perform discontinuous reception (DRX) for the purpose of reducing power consumption.

More specifically, a network configures several paging occasions (POs) in every time cycle called a paging DRC cycle and a specific UE receives only a specific paging occasion and acquires a paging message. The UE does not receive a paging channel in occasions other than the specific occasion and may be in a sleep state in order to reduce power consumption. One paging occasion corresponds to one TTI.

The eNB and the UE use a paging indicator (PI) as a specific value indicating transmission of a paging message. The eNB may define a specific identity (e.g., paging-radio network temporary identity (P-RNTI) as the PI and inform the UE of paging information transmission. For example, the UE awakes in every DRX cycle and receives one subframe in order to check whether a paging message is received. If a P-RNTI is present in an L1/L2 control channel (PDCCH) of a subframe received by the UE, the UE may confirm that a paging message is present in a PDSCH of the subframe. In addition, if the identity (e.g., IMSI) of the UE is present in the paging message, the UE responds to the eNB (e.g., receives RRC connection or system information) and receives a service from the eNB.

Next, system information will be described. The system information includes essential information necessary to connect a UE to an eNB. Accordingly, the UE should receive all system information before being connected to the eNB and always have new system information. Since all UEs located in a cell should know system information, the eNB periodically transmits the system information.

The system information may be divided into a master information block (MIB), a scheduling block (SB) and a system information block (SIB). The MIB enables a UE to become aware of a physical configuration of a cell, for example, a bandwidth. The SB indicates transmission information of SIBs, for example, a transmission period. The SIB is a set of associated system information. For example, a specific SIB includes only information about peripheral cells and another SIB includes only information about an uplink radio channel used by a UE.

Hereinafter, a cell selection and cell reselection process will be described.

If a UE is powered on, the UE selects a cell having appropriate quality and performs a preparation procedure for receiving a service. A UE in an RRC_IDLE state should always select appropriate quality and prepare to receive a service from the cell. For example, a UE which is just turned on should select a cell having appropriate quality in order to perform registration with a network. If a UE in an RRC_CONNECTED state enters an RRC_IDLE state, the UE should select a cell on which the UE will camp in the RRC_IDLE state. A process of, at a UE, selecting a cell satisfying a specific condition in order to camp on the cell in a service standby state such as an RRC_IDLE state is referred to as cell selection. Since cell selection is performed in a state in which the UE does not determine a cell on which the UE camps in the RRC_IDLE state, it is important to select a cell as fast as possible. Accordingly, a cell which provides radio signal quality equal to or greater than a predetermined reference may be selected in the cell selection process of the UE, although the cell does not provide the best radio signal quality to the UE.

If a UE selects a cell satisfying a cell selection reference, the UE receives information necessary for operation of the UE in an RRC_IDLE state in the cell from system information of the cell. The UE receives all information necessary for operation of the RRC_IDLE state and then requests a service from a network or a waits reception of a service from the network in the RRC_IDLE state.

After a UE selects a certain cell in a cell selection process, the intensity or quality of a signal between the UE and an eNB may be changed due to mobility of the UE or wireless environment change. Accordingly, if the quality of the selected cell deteriorates, the UE may select another cell which provides better quality. If the cell is reselected, a cell which provides better signal quality than that of a currently selected cell is generally selected. Such a process is referred to as cell reselection. The cell reselection process is performed in order to select a cell which provides the best quality to the UE from the viewpoint of the quality of the radio signal. In addition to the quality of the radio signal, the network may set priority per frequency and inform the UE of the priority. The UE which receives the priority preferentially takes the priority into consideration, rather than radio signal quality.

Next, a random access (RA) procedure provided in an LTE system will be described. The RA procedure provided in the LTE system is divided into a contention based random access procedure and a non-contention based random access procedure. The contention based random access procedure or the non-contention based random access procedure is determined depending on whether a random access preamble used in the RA procedure is directly selected by a UE or is selected by an eNB.

In the non-contention based random access procedure, the UE uses a random access preamble which is directly allocated thereto by the eNB. Accordingly, if the eNB allocates the specific random access preamble only to the UE, the random access preamble is used only by the UE and other UEs do not use the random access preamble. Accordingly, since the random access preamble corresponds one-to-one to the UE which uses the random access preamble, no contention occurs. In this case, since the eNB may become aware of the UE which transmits the random access preamble as soon as the eNB receives the random access preamble, efficiency is good.

In the contention based random access procedure, since a random access preamble is arbitrarily selected from among random access preambles which may be used by the UE and is transmitted, a plurality of UEs may always use the same random access preamble. Accordingly, when the eNB receives a specific random access preamble, the eNB may not check which UE transmits the random access preamble.

The UE performs the random access procedure 1) if a UE performs initial access without RRC connection with an eNB, 2) if a UE first accesses a target cell in a handover process, 3) if a random access procedure is requested by a command of an eNB, 4) if uplink data is generated in a state in which uplink time synchronization is not performed or radio resources to be used to request radio resources are not allocated and 5) upon a restoring process due to radio link failure or handover failure.

Figure 7:
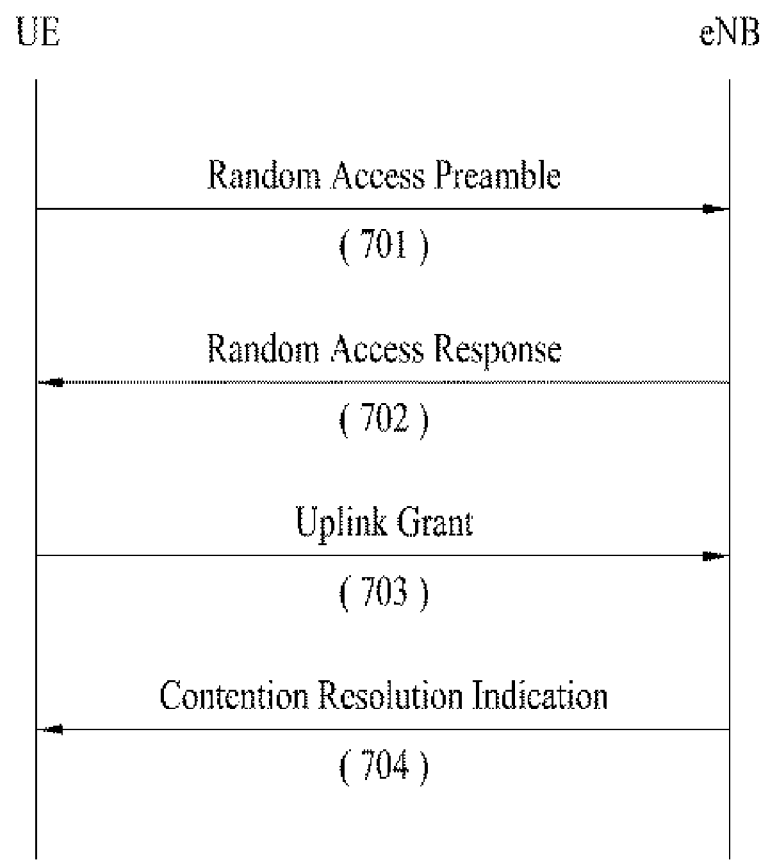
FIG. 7 is a diagram showing operations of a UE and an eNB in a contention based random access procedure provided in an LTE system.

FIG. 7 is a diagram showing operations of a UE and an eNB in a contention based random access procedure provided in an LTE system.

Referring to FIG. 7, in step 701, the UE may randomly select a single random access preamble from a set of random access preambles indicated through system information or a handover command, and select and transmit Physical Random Access Channel (PRACH) resources capable of transmitting the random access preamble. At this time, the preamble is called RACH MSG 1.

In step 702, the UE attempts to receive its own random access response within a random access response reception window indicated by the eNB through the system information or the handover command, after the random access preamble is transmitted. More specifically, RACH MSG 2, that is, random access response information is transmitted in the form of a MAC PDU and the MAC PDU is sent via a PDSCH. In addition, a PDCCH is also sent in order to enable the UE to appropriately receive the information sent via the PDSCH. That is, the PDCCH includes information about the UE which should receive the PDSCH, frequency and time information of radio resources of the PDSCH and the transmission format of the PDSCH. If the UE successfully receives the PDCCH, the random access response transmitted via the PDSCH is appropriately received according to the information about the PDCCH. The random access response includes a random access preamble identity, UL grant, a temporary C-RNTI, a time alignment command, etc. The reason why the random access preamble identity is necessary is because random access response information for one or more UEs may be included in one random access response and thus it is necessary to indicate for which UE the uplink grant, the temporary C-RNTI and the time alignment command are valid. The random access preamble identity matches the random access preamble selected by the UE in step 701.

Subsequently, in step 703, if the UE has received the random access response valid for the UE, the UE processes all information included in the random access response. That is, the UE applies the time alignment command and stores the temporary C-RNTI. In addition, data which is stored in the buffer of the UE or newly generated data is transmitted to the eNB using the uplink grant. At this time, data transmitted via the uplink grant, that is, MAC PDU, is referred to as RACH MSG 3. The identity of the UE should necessarily be included in the data included in the uplink grant. This is because the eNB may not determine which UE performs the random access procedure in the contention based random access procedure and thus should identify the UE in order to perform contention resolution later. Here, there are two different schemes for including the UE identity. A first scheme is to transmit the UE's cell identity through UL grant if the UE has already received a valid cell identity allocated by a corresponding cell prior to the random access procedure. Conversely, the second scheme is to transmit the UE's unique identity if the UE has not received a valid cell identity prior to the random access procedure. In general, the unique identity is longer than the cell identity. If the UE has transmitted data through the UL Grant, the UE starts a contention resolution (CR) timer.

Finally, after the UE transmits the data including its own identity through the UL Grant included in the random access response, the UE waits for an indication from the eNB for contention resolution. That is, the UE attempts to receive the PDCCH in order to receive a specific message. Here, there are two schemes for receiving the PDCCH. As described above, the UE attempts to receive the PDCCH using its own cell identity if the identity transmitted via the UL Grant is a cell identity, and the UE attempts to receive the PDCCH using the temporary C-RNTI included in the random access response if the identity is its own unique identity. Thereafter, in the former scheme, if the PDCCH (that is, RACH MSG 4) has been received through its own cell identity before the contention resolution timer has expired, the UE determines that the random access procedure has been normally performed and completes the random access procedure. In the latter scheme, if the PDCCH has been received through the temporary C-RNTI before the contention resolution timer has expired, the UE checks data transferred by the PDSCH indicated by the PDCCH. If the unique identity of the UE is included in the data, the UE determines that the random access procedure has been normally performed and completes the random access procedure.

Figure 8:
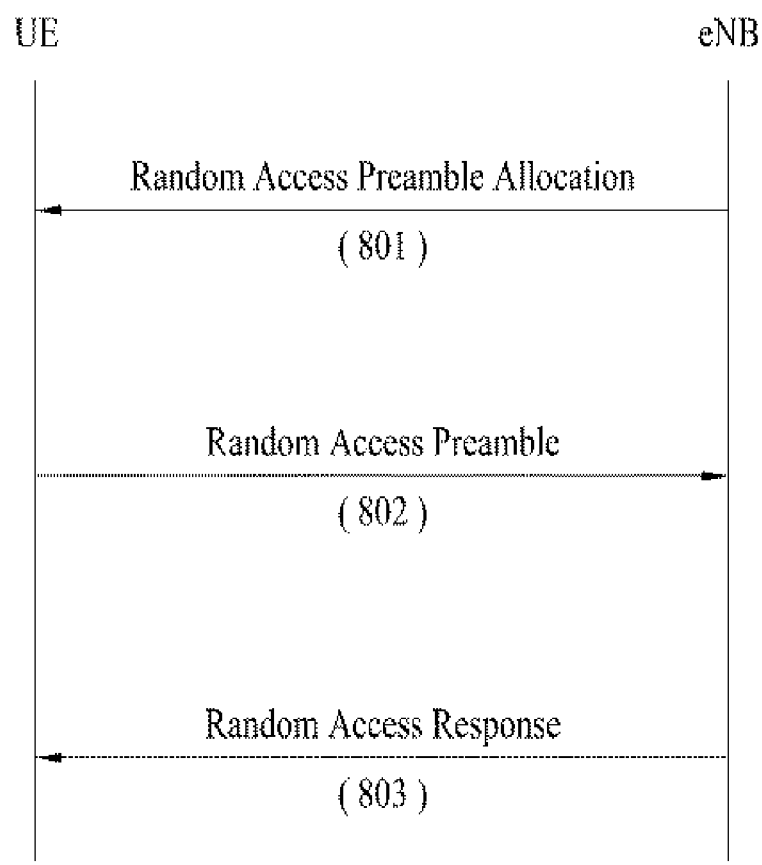
FIG. 8 is a diagram showing operations of a UE and an eNB in a non-contention based random access procedure provided in an LTE system.

FIG. 8 is a diagram showing operations of a UE and an eNB in a non-contention based random access procedure provided in an LTE system.

As described above, in the non-contention based random access procedure, unlike the contention based random access procedure, if the random access response information is received, the UE determines that the random access procedure has been normally performed and completes the random access procedure. In addition, the non-contention random access procedure may be performed upon a handover process or when this procedure is requested by the eNB. Of course, even in these cases, the contention based random access procedure may be performed. First, for the non-contention based random access procedure, it is important to receive, from the eNB, a dedicated random access preamble which may not cause contention. In order to receive the random access preamble, a handover command and a PDCCH command may be used.

In addition, the eNB may set PRACH resources to be used when the UE transmits the random access preamble. The PRACH resources include a subframe and frequency resources to be used when the UE transmits the random access preamble.

Table 1 shows PRACH mask indices of PRACH resources which are set by the eNB with respect to the UE.

TABLE 1

| PRACH Mask Index | Allowed PRACH (FDD) | Allowed PRACH (TDD) |
| --- | --- | --- |
| 0 | All | All |
| 1 | PRACH Resource Index 0 | PRACH Resource Index 0 |
| 2 | PRACH Resource Index 1 | PRACH Resource Index 1 |
| 3 | PRACH Resource Index 2 | PRACH Resource Index 2 |
| 4 | PRACH Resource Index 3 | PRACH Resource Index 3 |
| 5 | PRACH Resource Index 4 | PRACH Resource Index 4 |
| 6 | PRACH Resource Index 5 | PRACH Resource Index 5 |
| 7 | PRACH Resource Index 6 | Reserved |
| 8 | PRACH Resource Index 7 | Reserved |
| 9 | PRACH Resource Index 8 | Reserved |
| 10 | PRACH Resource Index 9 | Reserved |
| 11 | Every, in the time domain, even PRACH opportunity $1^{st}$ PRACH Resource Index in subframe | Every, in the time domain, even PRACH opportunity $1^{st}$ PRACH Resource Index in subframe |
| 12 | Every, in the time domain, odd PRACH opportunity $1^{st}$ PRACH Resource Index in subframe | Every, in the time domain, odd PRACH opportunity $1^{st}$ PRACH Resource Index in subframe |
| 13 | Reserved | $1^{st}$ PRACH Resource Index in subframe |
| 14 | Reserved | $2^{nd}$ PRACH Resource Index in subframe |
| 15 | Reserved | $3^{rd}$ PRACH Resource Index in subframe |

For example, in the FDD mode, the UE may transmit the random access preamble in one subframe or even subframes or odd subframes among 10 subframes according to the PRACH mask indices of Table 1.

Referring to FIG. 8, the UE receives a random access preamble allocated by the eNB in step 801 and transmits the preamble to the eNB in step 802. A method of receiving a random access response in step 803 is equal to that of the contention based random access procedure of FIG. 7.

Now, measurement and measurement report will be described.

In the following description, "measurement" indicates that a UE receives reference signals from inter-frequency, intra-frequency and inter-RAT cells according to measurement settings received from a network and measures quality values of corresponding cells. In the following description, "quality" refers to signal quality or cell quality which is checked via a reference signal received from a cell to be measured.

In a mobile communication system, in association with UE mobility support, the UE measures quality of a serving cell which currently provides a service and quality of a neighboring cell at least in a discontinuous reception (DRX) cycle. The UE reports a cell quality measurement result to a network at an appropriate time and the network provides optimal mobility to the UE via handover.

A UE may perform measurement for a special purpose set by a network and report a cell quality measurement result to the network, in order to provide information which aids a provider in managing a network, in addition to the purpose of supporting mobility. For example, a UE receives broadcast information of a specific cell set by a network. The UE may report a cell identity (also referred to as a global cell identity) of the specific cell, location identification (e.g., tracking area code) of the specific cell and/or other cell information (e.g., member of a closed subscriber group (CSG)) to a serving cell.

If a UE which is moving determines that the quality of a specific region is very bad through measurement, it is possible to report location information of cells having bad quality and a cell quality measurement result to a network. The network may be optimized based on the report of the cell quality measurement result of UEs which aid in network management.

In a mobile communication system in which a frequency reuse factor is 1, a UE mostly moves between different cells having the same frequency band. Accordingly, in order to guarantee mobility of the UE, the UE should measure quality of peripheral cells having the same center frequency as the center frequency of a serving cell and cell information well. Measurement of the cell having the same center frequency as the center frequency of the serving cell is referred to as intra-frequency measurement. The UE performs intra-frequency measurement and reports a cell quality measurement result to a network at an appropriate time, thereby achieving the purpose of the cell quality measurement result.

A mobile communication provider may manage a network using a plurality of frequency bands. If a service of a communication system is provided via a plurality of frequency bands, in order to guarantee optimal mobility of a UE, the UE should measure quality of peripheral cells having center frequencies different from the center frequency of the serving cell and cell information well. Measurement of a cell having a center frequency different from the center frequency of the serving cell is referred to as inter-frequency measurement. The UE performs inter-frequency measurement and reports a cell quality measurement result to a network at an appropriate time.

If the UE supports measurement of a heterogeneous network, measurement of a cell of the heterogeneous network may be performed by settings of eNB. Measurement of the heterogeneous network is referred to as inter-radio access technology (RAT) measurement. For example, RAT may include a UMTS terrestrial radio access network (UTRAN) and a GSM EDGE radio access network (GERAN) which follow the 3GPP standard and may also include a CDMA 2000 system which follows the 3GPP2 standard.

Hereinafter, a minimization of drive test (MDT) scheme will be described.

MDT indicates that a provider measures the quality of a cell using a vehicle for cell coverage optimization. Instead of a conventional method of performing a drive test, MDT may enable UEs to perform measurement and to report a measurement result. Therefore, it is possible to generate a cell coverage map and minimize time and cost required to optimize a network.

The MDT scheme includes two schemes: a logged MDT scheme and an immediate MDT scheme. The logged MDT scheme refers to a scheme for, at a UE, performing measurement for MDT, logging data in a log, and transferring the data to a network at a specific time. The immediate MDT scheme refers to a scheme for performing measurement for MDT and immediately transmitting data to a network. These schemes are different in that the result measured by the UE is immediately reported to the eNB or is logged and then reported. In particular, since a UE in an RRC_IDLE state does not establish RRC connection and thus may not immediately report a quality measurement result, the logged MDT scheme is used.

Figure 9:
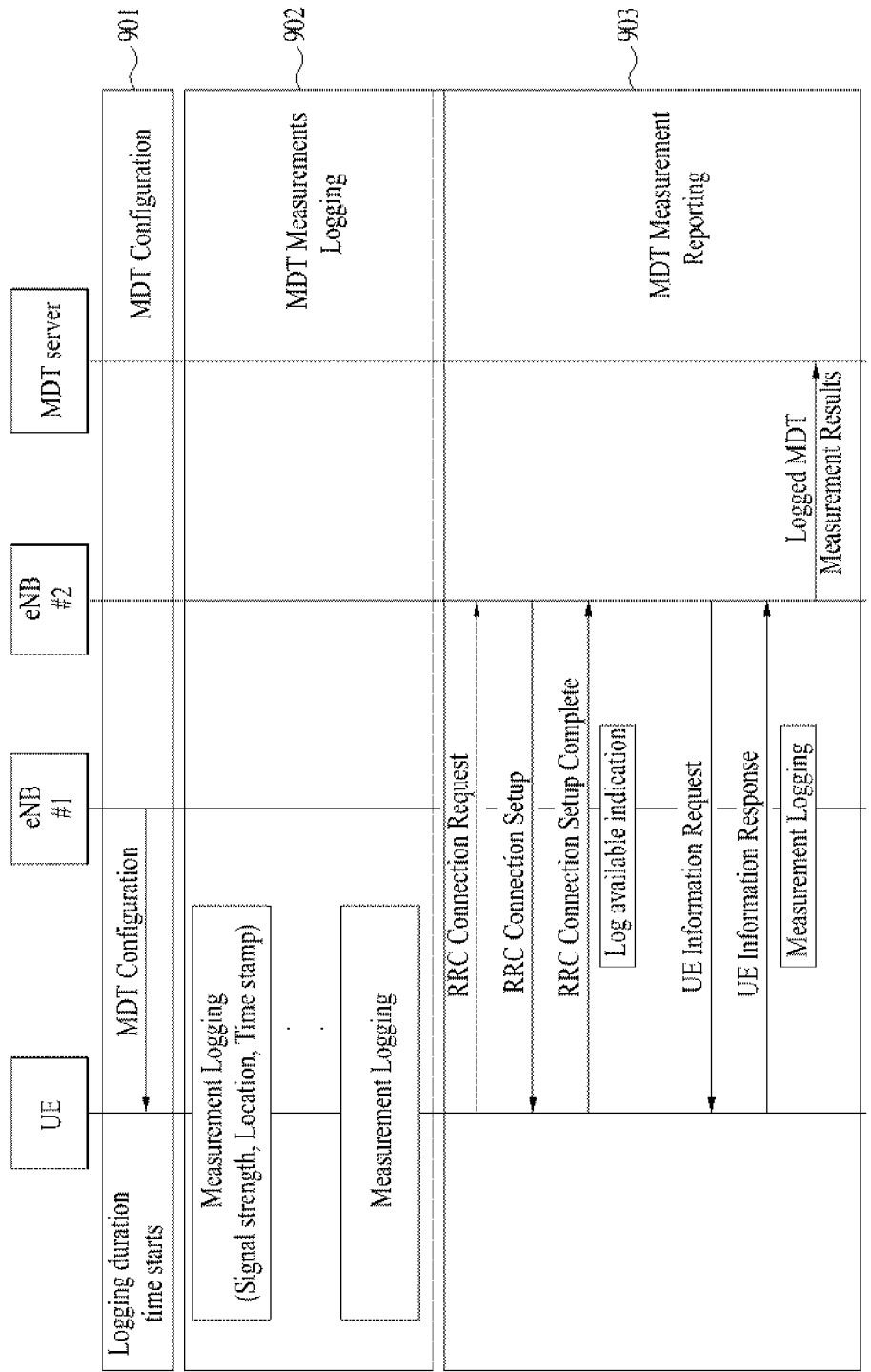
FIG. 9 is a flow diagram of a logged MDT scheme.

FIG. 9 is a flow diagram of a logged MDT scheme.

Referring to FIG. 9, first, in order to perform the logged MDT, a UE may receive a message including a logged MDT configuration from a cell in step 901.

The logged MDT configuration received by the UE may include a triggering configuration for logging, an MDT configuration duration, and an area configuration for performing MDT.

Next, in step 902, the UE starts a duration timer for the logged MDT configuration as soon as the logged MDT configuration is received. Only while the duration timer operates, the UE logs the measurement result for the logged MDT in an MDT log in an RRC_IDLE state at a predetermined period. The predetermined period is a period for logging the measurement result according to the logged MDT configuration in the MDT log, is hereinafter referred to as a logging cycle, and may be generally represented by a multiple of a DRX cycle.

Meanwhile, if the duration timer has expired, the UE deletes the MDT configuration. However, the UE holds the logged MDT cell quality measurement result for a predetermined period of time (e.g., 48 hours) and further has an opportunity to report the MDT measurement value logged during this period to a cell.

A value measured for MDT is the quality of a cell on which a UE camps and is measured by reference signal received power (RSRP) and reference signal received quality (RSRQ). If a logged MDT is configured in a UE, the UE measures the quality of a cell in an RRC_IDLE state, logging an MDT measurement value, and reports the MDT measurement value to a network.

A provider collects MDT measurement values received from several UEs, creates a coverage map indicating whether a service can be provided in the whole region to which the provider provides a service and the quality distribution of the service, and uses the coverage map in network management and optimization. For example, if a coverage problem of a specific region is reported from a UE, a provider may increase transmit power of an eNB for providing the service to the region and extend the coverage of the cell of the region.

A cell quality measurement result for MDT may be used interchangeably with a log, a UE log value, a measurement value, a cell quality measurement result, etc., but, for simplicity of description, is hereinafter referred to as an MDT measurement result.

Finally, a process of reporting the MDT measurement result of step 903 will be described.

If the UE has performed logged MDT and logged an MDT measurement result, the UE informs a network that the MDT measurement result has been logged via an RRC connection setup complete message upon RRC connection establishment.

The network which receives, from the UE, information indicating that the MDT measurement result has been logged sends a command for transmitting the logged MDT cell quality measurement result to the UE and the UE transmits the logged MDT measurement result to the network in response to the command.

In addition to RRC connection establishment, even in RRC connection reestablishment, the UE may inform the network that the MDT measurement result has been logged via an RRC connection reestablishment complete message.

In addition, if the UE performs handover from a serving cell to a target cell, the UE may inform the target cell that the MDT measurement result has been logged via a handover complete message.

Meanwhile, the UE should be in the RRC_CONNECTED state in order to receive a service such as Internet access from the network. However, if the UE is always in the RRC_CONNECTED state, battery power is consumed due to connection with the eNB. In order to prevent battery power consumption, the UE transitions from the RRC_IDLE state to the RRC_CONNECTED state only when there is user data which is actually transmitted or received.

In order to enable the UE of the RRC_IDLE state to transition to the RRC_CONNECTED state, the UE performs an RRC connection establishment procedure. The UE transmits an RRC connection request message to the eNB via the RRC connection establishment procedure and then receives an RRC connection setup message from the eNB, thereby completing the RRC connection establishment procedure. At this time, the UE performs a random access procedure in order to send the RRC connection request message.

However, the random access procedure performed by the UE is not always successful. For example, if power of the UE is insufficient or if the UE performs the random access procedure in one cell, the random access procedure performed by the UE may fail. At this time, if the UE is performing the RRC connection establishment procedure, the RRC connection establishment procedure may fail.

In general, the UE measures the quality of the downlink signals of cells at a current location, selects a best cell, and attempts to access the best cell. However, a best downlink signal does not always guarantee a best uplink signal. In some cases, the UE may attempt to establish RRC connection in a region in which downlink signal reception is enabled but uplink access is disabled. In this case, since the UE does not successfully access the eNB, the eNB does not recognize access of the UE and does not readjust system parameters. Accordingly, another UE which accesses the eNB in this region may not receive a service. That is, in the conventional scheme, although the UE attempts to access the network, if access fails, the network does not recognize access failure and does not attempt to make improvements. As a result, the quality of the service received by the UE is deteriorated.

In the present invention, in order to solve the problem that, although the UE should be changed from the RRC_IDLE state to the RRC_CONNECTED state, a process of changing the state is not appropriately performed such that the UE does not receive an appropriate service, the UE records information about change failure if change in the RRC state of the UE fails in the process of changing the RRC state and sends the recorded information to the network later.

More specifically, the UE performs an RRC connection establishment procedure when transitioning from the RRC_IDLE state to the RRC_CONNECTED state, records information indicating that the RRC connection establishment procedure has not been successfully performed if the RRC connection establishment procedure has not been successfully performed, and transmits the recorded information to the network later. In this process, the UE inevitably performs a random access procedure in order to complete the RRC connection establishment procedure. If the random access procedure fails while the random access procedure is performed, the UE records information about random access procedure failure and informs the network of the information about random access procedure failure later.

In the above process, information shown in Table 2 generated while the UE transitions from the RRC_IDLE state to the RRC_CONNECTED state is recorded.

TABLE 2

- Whether an RA procedure has failed- Place where an RA procedure has failed- Number of times of transmission of an RA preamble in an RA procedure- RA associated configuration information used in an RA procedure- Signal measurement information of a cell in which an RA procedure has failed and peripheral cells- Power information used by a UE in an RA procedure- Maximum transmit power of a UE- Whether an RA response including preamble information matching an RA preamble transmitted by a UE has been received- Whether an RRC connection establishment reject message has been received- Number of RA attempts due to contention occurring during RA attempts- Whether an RA response including information including RA preamble transmitted by a UE has been received during a last RA attempt- Whether contention has occurred in a last RA attempt or whether contention resolution is successful- Number of times of reception of an RA response including information matching an RA preamble transmitted by a UE during RA attempts- Whether a downlink resource allocation message masked with T-C-RNTI corresponding to a UE has been received in an RA procedure performed by a UE- Whether a UE has successfully completed a contention resolution process In Table 2, a determination as to whether a UE has successfully completed a contention resolution process is made with respect to an RRC idle state UE and thus may be replaced with a determination as to whether a MAC PDU masked with a T-C-RNTI to be transmitted has successfully been received, a determination as to whether a UE contention resolution identity MAC control element (CE) matching information sent by a UE has been received or a determination as to whether a UE contention resolution identity MAC CE has been received.

Thereafter, if the UE has successfully transitioned to the RRC_CONNECTED state and the UE has the recorded information, the UE informs the network of the recorded information. More specifically, when the UE is in the RRC_IDLE state, the UE informs the network that an RRC RACH procedure has failed and the information about RRC RACH procedure failure has been recorded. As described above, the UE performs only the RRC connection establishment procedure in order to transition from the RRC_IDLE state to the RRC_CONNECTED state. Accordingly, RRC RACH procedure failure in the RRC_IDLE state is equal to failure of the RRC connection establishment procedure performed by the UE.

Accordingly, in the present invention, the UE starts the RRC connection establishment procedure, records information about failure of the RRC connection establishment procedure if the RRC connection establishment procedure has not been successfully completed, and reports information about failure of the RRC connection establishment procedure to the network when connection with the network is established later. The information about failure is shown in Table 3.

TABLE 3

- Place where an RRC connection establishment procedure has failed- Number of times of transmission of an RA preamble in an RRC connection establishment procedure- RA associated configuration information used in an RRC connection establishment procedure- Signal measurement information of a cell in which an RRC connection establishment procedure has failed and peripheral cells- Power information used by a UE in an RA procedure of an RRC connection establishment procedure - Whether an RRC connection establishment reject message has been received-

TABLE 3-continued

Maximum transmit power of a UE in an RRC connection establishment procedure- Number of RA attempts due to contention occurring during RA attempts in an RRC connection establishment procedure- Number of times of reception of an RA response including information matching an RA preamble transmitted by a UE during RA attempts in an RRC connection establishment procedure- Whether an RA response including information matching an RA preamble transmitted by a UE has received during a last RA attempt in an RRC connection establishment procedure- Whether contention has occurred in a last RA attempt in an RRC connection establishment procedure or contention resolution is successful- Whether an RA response including preamble information matching an RA preamble transmitted by a UE has received- Whether a downlink resource allocation message masked with T-C-RNTI corresponding to a UE has been received in an RA procedure of an RRC connection establishment procedure- Whether a UE has successfully completed a contention resolution process Similarly, in Table 3, a determination as to whether a UE has successfully completed a contention resolution process is made with respect to an RRC idle state UE and thus may be replaced with a determination as to whether a MAC PDU masked with a T-C-RNTI to be transmitted has successfully been received, a determination as to whether a UE contention resolution identity MAC control element (CE) matching information sent by a UE has been received or a determination as to whether a UE contention resolution identity MAC CE has been received.

In addition, in the present invention, if a UE reselects a cell and performs an RRC connection reestablishment procedure upon handover failure or radio link failure (RLF), the UE logs information about failure occurring in the RRC connection reestablishment procedure for cell reselection and report the information to a network later.

More specifically, in the present invention, the UE starts the RRC connection reestablishment procedure for cell reselection and logs information about failure if the procedure has not been successfully completed. If the above procedure has not been successfully completed and thus the information about failure of the procedure is logged, the UE may log information about why the RRC connection reestablishment procedure for cell reselection has not been successfully completed as information about the failure.

For example, if the RRC connection reestablishment procedure for cell reselection is stopped by expiration of the timer T311, the UE records information indicating that the procedure has failed by expiration of the T311. Alternatively, if the procedure has failed in a state in which the UE selects another RAT cell such as GSM or WCDMA, the UE records information about failure. If a UE starts an RRC connection reestablishment procedure for cell reselection and then receives an RRC connection reestablishment reject message from a network so as to stop the RRC connection reestablishment procedure for cell reselection, the UE records information indicating that the RRC connection reestablishment procedure has failed by receiving the RRC connection reestablishment reject message.

Table 4 shows information about failure, which may be transmitted to a network, if an RRC connection reestablishment procedure has not been successfully completed, in the RRC connection reestablishment procedure for cell reselection.

TABLE 4

- Whether an RRC connection reestablishment procedure has failed- Place where an RRC connection reestablishment procedure has failed- Whether an RA procedure has failed in an RRC connection reestablishment procedure- Information as to whether T311 has expired- Whether an RRC connection reestablishment reject message has been received- Whether another RAT cell has been selected- Whether a cell of another frequency has been selected- Number of times of transmission of an RA preamble in an RA procedure of an RRC connection reestablishment procedure- RA associated configuration information used in an RA procedure- Signal measurement information of a cell in which an RRC connection reestablishment procedure has failed and peripheral cells- Number of RA attempts due to contention occurring during RA attempts during an RRC connection reestablishment procedure- Number of times of reception of an RA response including information matching an RA preamble transmitted by a UE during RA attempts in an RRC connection reestablishment procedure- Whether an RA response including information matching a preamble transmitted by a UE has been received during a last RA attempt in an RRC connection reestablishment procedure- Whether contention has occurred during a last RA attempt in an RRC connection reestablishment procedure or contention resolution is successful- Power information by a UE in an RA procedure- Information indicating whether a UE uses maximum transmit power- Whether an RA response including preamble information matching an RA preamble transmitted by a UE has received- Whether a downlink resource allocation message masked with T-C-RNTI corresponding to a UE has been received in an RA procedure of an RRC connection reestablishment procedure- Whether a UE has successfully completed a contention resolution process Similarly to Tables 2 and 3, in Table 4, a determination as to whether a UE has successfully completed a contention resolution process is made with respect to an RRC idle state UE and thus may be replaced with a determination as to whether a MAC PDU masked with a T-C-RNTI to be transmitted has successfully been received, a determination as to whether a UE contention resolution identity MAC control element (CE) matching information sent by a UE has been received or a determination as to whether a UE contention resolution identity MAC CE has been received.

According to the present invention, since the UE efficiently measures and reports support information, it is possible to reduce capital expenditure (CAPEX) and operating expenditures (OPEX) of the network.

Figure 10:
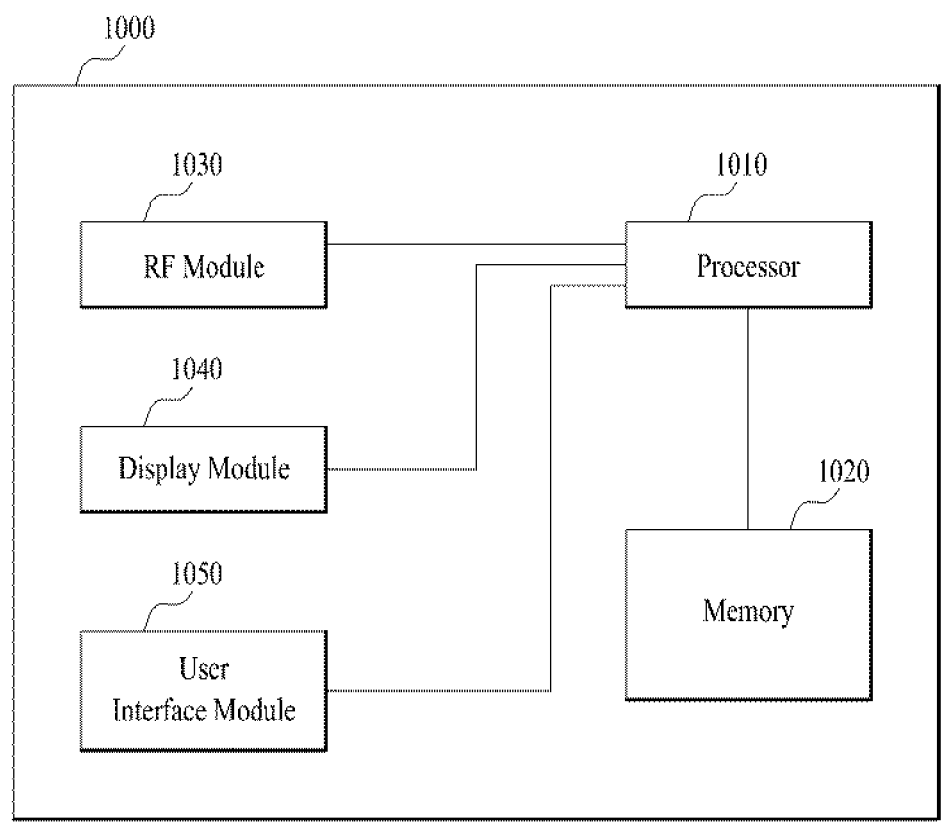
FIG. 10 is a block diagram of a communication apparatus according to an embodiment of the present invention.

FIG. 10 is a block diagram of a communication apparatus according to an embodiment of the present invention.

Referring to FIG. 10, a communication apparatus 1000 includes a processor 1010, a memory 1020, a Radio Frequency (RF) module 1030, a display module 1040 and a user interface module 1050.

The communication apparatus 1000 is shown for convenience of description and some modules thereof may be omitted. In addition, the communication apparatus 1000 may further include necessary modules. In addition, some modules of the communication apparatus 1000 may be subdivided. The processor 1010 is configured to perform an operation of the embodiment of the present invention described with respect to the drawings. For a detailed description of the operation of the processor 1010, reference may be made to the description associated with FIGS. 1 to 9.

The memory 1020 is connected to the processor 1010 so as to store an operating system, an application, program code, data and the like. The RF module 1030 is connected to the processor 1010 so as to perform a function for converting a baseband signal into a radio signal or converting a radio signal into a baseband signal. The RF module 1030 performs analog conversion, amplification, filtering and frequency upconversion or inverse processes thereof.

The display module 1040 is connected to the processor 1010 so as to display a variety of information. As the display module 1040, although not limited thereto, a well-known device such as a Liquid Crystal Display (LCD), a Light Emitting Diode (LED), or an Organic Light Emitting Diode (OLED) may be used. The user interface module 1050 is connected to the processor 1010 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example of applying a method of transmitting and receiving a signal to and from a network at a user equipment (UE) in a wireless communication system and an apparatus for the same to a 3GPP LTE system is described, the present invention is applicable to various wireless communication systems in addition to the 3GPP LTE system.

The invention claimed is:

1. A method of transmitting and receiving a signal to and from a network by a user equipment (UE) in a wireless communication system, the method comprising:
    logging mobile driving test (MDT) information including a MDT measurement result in a radio resource control (RRC) idle state;
    adding information about a failure of a first connection establishment procedure into the logged MDT information, if the first connection establishment procedure with the network has failed in a specific location; and
    transmitting the MDT information with the added information about the failure of the first connection establishment to the network in a RRC connected state when a second connection establishment procedure with the network is successful,
    wherein the information about the failure of the first connection establishment includes a number of random access preamble transmissions attempted during the first connection establishment procedure with the network and information on the specific location, and
    wherein, in the specific location, a downlink reception of the UE is enabled and an uplink transmission of the UE is disabled.

2. The method according to claim 1, wherein the transmitting includes:
    transmitting, to the network, a message indicating that the UE has the MDT information;
    receiving, from the network, a message requesting the MDT information; and
    transmitting the MDT information to the network.

3. A user equipment (UE) configured to transmit and receive a signal to and from a network in a wireless communication system, the UE comprising:
    a radio frequency (RF) device; and
    a processor operatively connected to the RF device and configured to:
        log mobile driving test (MDT) information including a MDT measurement result in a radio resource control (RRC) idle state;
        add information about a failure of a first connection establishment procedure into the logged MDT information, if the first connection establishment procedure with the network has failed in a specific location; and
        transmit the MDT information with the added information about the failure of the first connection establishment to the network in a RRC connected state when a second connection establishment procedure with the network is successful,
        wherein the information about the failure of the first connection establishment includes a number of random access preamble transmissions attempted during the first connection establishment procedure with the network and information on the specific location, and wherein, in the specific location, a downlink reception of the UE is enabled and an uplink transmission of the UE is disabled.

* * * * *